United States Patent

Kahr et al.

[19]

[11] Patent Number: 5,815,362

[45] Date of Patent: Sep. 29, 1998

[54] PULSE WIDTH MODULATED DRIVE FOR AN INFINITELY VARIABLE SOLENOID OPERATED BRAKE CYLINDER PRESSURE CONTROL VALVE

[75] Inventors: Barry J. Kahr, Fountain Inn; John H. Corvin, Greer, both of S.C.

[73] Assignee: Westinghouse Air Brake Company, Wilmerding, Pa.

[21] Appl. No.: 759,411

[22] Filed: Dec. 4, 1996

[51] Int. Cl.[6] .................................................. H01H 47/32
[52] U.S. Cl. .......................................... 361/153; 361/154
[58] Field of Search .................................... 361/152–156

[56] References Cited

U.S. PATENT DOCUMENTS

| | | | |
|---|---|---|---|
| 4,978,865 | 12/1990 | Hartmann et al. | 361/154 |
| 5,490,031 | 2/1996 | Braun et al. | 361/154 |
| 5,621,603 | 4/1997 | Adamec et al. | 361/154 |

*Primary Examiner*—Fritz Fleming
*Attorney, Agent, or Firm*—James Ray & Associates

[57] ABSTRACT

A pulse width modulated drive circuit drives a solenoid operated valve in response to an input voltage signal from a control apparatus. The solenoid operated valve includes a coil that is energizable in response to energy received from the pulse width modulated drive circuit. The pulse width modulated drive circuit includes a pulse generator stage and an output stage. The pulse generator stage receives the input voltage signal from the control apparatus and a feedback signal from the coil which ultimately combine to form a control voltage in response to which the pulse generator stage generates a pulse width modulated signal whose duty cycle depends on the control voltage. The output stage receives the pulse width modulated signal from the pulse generator stage and generates in response thereto a pulse width modulated output signal across the coil. The pulse width modulated output signal has pulse width generally proportional to the control voltage and carries energy from a source of energy. The pulse width modulated output signal energizes the coil thereby enabling the coil to generate a force generally proportional to the average current carried by the pulse width modulated output signal.

20 Claims, 5 Drawing Sheets

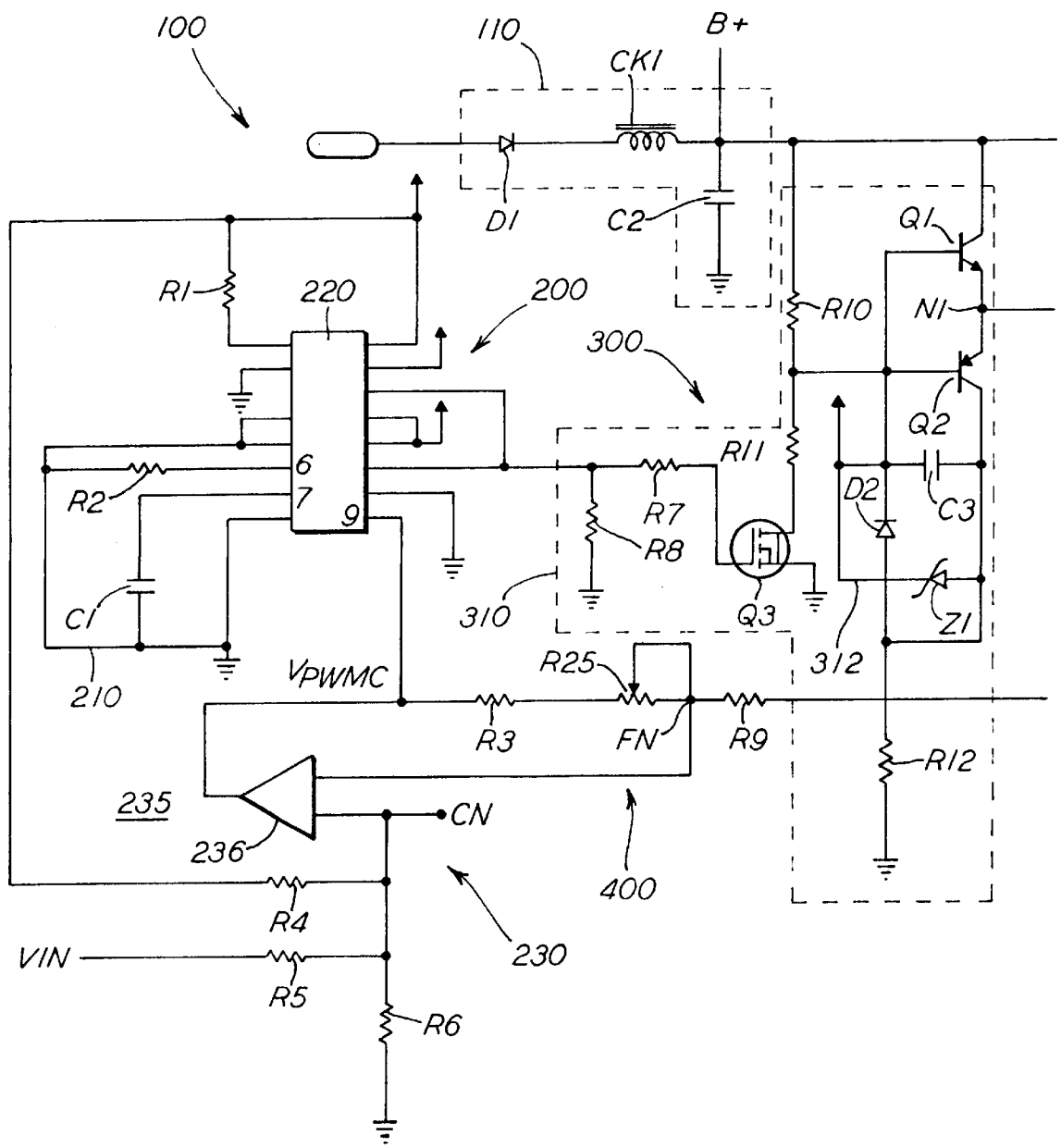
FIG. IA

PULSE WIDTH MODULATED DRIVE FOR AN INFINITELY VARIABLE SOLENOID OPERATED BRAKE CYLINDER PRESSURE CONTROL VALVE

FIELD OF THE INVENTION

The present invention generally relates to a means for controlling a solenoid operated valve. More particularly, the present invention relates to a pulse width modulated drive circuit for driving an infinitely variable solenoid operated valve that is used to control pressure within a brake cylinder.

BACKGROUND OF THE INVENTION

Trains operating in passenger transit service generally employ electropneumatic brake control systems to control the brakes of the railway vehicles. These brake control systems typically feature an electronic brake controller that controls the overall operation of the brakes in response to numerous inputs received from various devices situated on the train. Such a brake controller typically controls a variety of solenoid operated valves through which the flow of pressurized air can be supplied to or deprived from any one or more of a plurality of pneumatically operated devices or volumes.

As is well known in the art, brake controllers typically control such solenoid operated valves through valve drive circuits. A brake controller, for example, may command a valve drive circuit to drive a valve through an input voltage signal. The brake controller adjusts the input voltage signal in response to a feedback signal received from a pressure sensing or other device. This pressure sensing device senses the pressure within the particular brake cylinder or other pneumatic component whose pressure is to be controlled. Through this feedback, the brake controller functions as a closed loop control system through which it controls the operation of the valve drive circuit and ultimately the solenoid operated valve.

The prior art valve drive circuit suffers from several disadvantages inherent to such drive circuits. First, the prior art valve drive circuit is incapable of delivering sufficient energy to the coil of the valve it drives so as to dislodge the spool of the valve when stuck and more forcefully move it towards the full release position. This problem generally leads to replacement of valves whose spools are merely temporarily stuck and not necessarily defective. This shortcoming imposes costs for the replacement of valves that would otherwise work with the present invention described below. The present invention thus permits the valve that it drives to operate more reliably than one driven by the prior art valve drive circuit.

Second, the prior art valve drive circuit employs bipolar junction transistor technology for its output driver circuit as opposed to field effect transistors used with the present invention. Another disadvantage is that the prior art valve drive circuit requires a separate 50 volt power supply and cannot be operated off of the battery of the rail vehicle in which it is placed like the present invention. These two disadvantages cause the prior art valve drive circuit to dissipate more power and to generate more heat than the present invention described below. This renders the prior art circuit far less reliable than the present invention described below.

The present document describes a pulse width modulated drive circuit that overcomes the disadvantages of the prior art valve drive circuit. The pwm drive circuit may be used to drive a solenoid operated valve through which pressure can be delivered to or deprived from any one or more of a variety of pneumatically operated devices or volumes. Examples of the types of volumes that such a pulse width modulated driven valve can be used to supply include any one of the various reservoirs or pneumatic trainlines typically found on railway vehicles. Examples of the types of pneumatically operated devices that such a pulse width modulated driven valve can be used to control include a variable load relay valve and a J-1 relay valve as shown and described in certain Operation & Maintenance Publications published by the Westinghouse Air Brake Company (WABCO). Notwithstanding the large number of applications to which the present invention may be applied, the present pwm drive circuit is described in connection with driving an infinitely variable solenoid operated valve through which the flow of pressurized air can be supplied to or release from a brake cylinder.

It should be apparent to persons skilled in the relevant art, however, that the present invention could be used to drive a variety of solenoid operated valves in addition to the infinitely variable solenoid operated valve discussed in this document. Obvious modifications to the present invention may be necessary, however, depending upon the specific type of solenoid operated valve to which the present invention is to be applied.

It should be noted that the foregoing background information is provided to assist the reader in understanding the present invention. Accordingly, any terms of art used herein are not intended to be limited to any particular narrow interpretation unless specifically stated otherwise in this document.

OBJECTS OF THE INVENTION

It is, therefore, a primary objects of the present invention to provide a pulse width modulated drive circuit for an infinitely variable solenoid operated valve used to control pressure within a brake cylinder.

Another object of the present invention is to provide a pulse width modulated drive circuit capable of driving any one of a variety of solenoid operated valves so as to control flow of pressurized air to any one of a variety of pneumatically operated devices or volumes.

Yet another object of the present invention is to provide a pulse width modulated drive circuit that is capable of delivering greater power than prior art drive circuits to the coil of an infinitely variable solenoid operated valve so as to dislodge the spool of the valve when stuck and more forcefully move it towards the full release position.

Still another object of the present invention is to provide a pulse width modulated drive circuit that dissipates less power and generates less heat than prior art drive circuits designed to operate an infinitely variable solenoid operated valve.

Even another object of the present invention is to provide a pulse width modulated drive circuit capable of operating an infinitely variable solenoid operated valve in various environments and over a wide range of temperatures.

A further object of the present invention is to provide a pulse width modulated drive circuit that permits a solenoid operated valve which it drives to operate more reliably than solenoid operated valves driven by prior art drive circuits.

Yet a further object of the present invention is to provide a pulse width modulated drive circuit that is capable of operating off of the battery of the rail vehicle in which it is placed without the need for a dedicated power supply typically required by prior art drive circuits.

Still a further object of the present invention is to provide a pulse width modulated drive circuit for energizing a coil of a solenoid operated valve through a pulse width modulated output signal thereby enabling the coil to generate a force generally proportional to the average current carried by the pulse width modulated output signal.

In addition to the object and advantages of the pulse width modulated drive circuit set forth above, various other object and advantages will become more readily apparent to persons skilled in the solenoid valve control art from a reading of the detailed description section of this document. Such other object and advantages will become particularly apparent when the detailed description is considered in conjunction with the attached drawings and with the appended claims.

SUMMARY OF THE INVENTION

In a presently preferred embodiment, the present invention provides a pulse width modulated drive circuit for driving a solenoid operated valve in response to an input voltage signal from a control apparatus. The solenoid operated valve includes a coil that is energizable in response to energy received from the pulse width modulated drive circuit. The pulse width modulated drive circuit includes a pulse generating means and an output means. The pulse generating means receives the input voltage signal from the control apparatus and a feedback signal from the coil which ultimately combine to form a control voltage in response to which the pulse generating means generates a pulse width modulated signal whose duty cycle depends on the control voltage. The output means receives the pulse width modulated signal from the pulse generating means and generates in response thereto a pulse width modulated output signal across the coil. The pulse width modulated output signal has pulse width generally proportional to the control voltage and carries energy from a source of energy. The pulse width modulated output signal energizes the coil thereby enabling the coil to generate a force generally proportional to the average current carried by the pulse width modulated output signal.

BRIEF DESCRIPTION OF THE DRAWINGS

FIGS. 1a and 1b illustrate a schematic of a pulse width modulated drive circuit according to the present invention.

DETAILED DESCRIPTION OF THE INVENTION

Figure 1B:
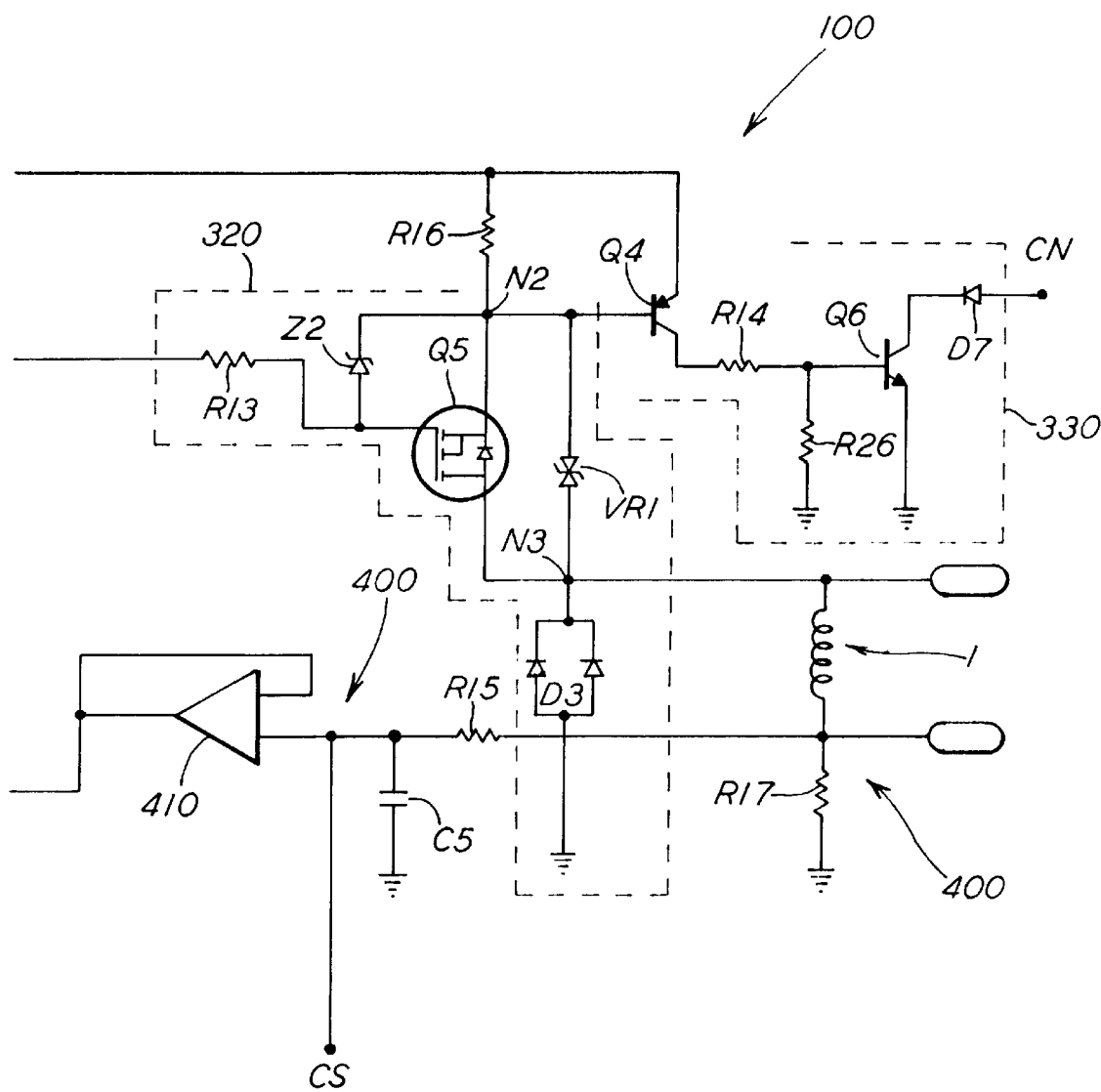

Before describing the present invention in detail, for the sake of clarity and understanding, the reader is advised that identical components having identical functions in each of the accompanying drawings have been marked with the same reference numerals throughout each of the several Figures in this document.

FIGS. 1a–b 2a–b and 3a–b illustrate the essential details of a presently preferred embodiment of a pulse width modulated drive circuit, generally designated 100. The pwm drive circuit 100 may be used to drive a solenoid operated valve through which pressure can be delivered to or deprived from any one or more of a variety of pneumatically operated devices or volumes. The pwm drive circuit 100 preferably drives an infinitely variable solenoid operated valve through which the flow of pressurized air can be supplied to or released from a brake cylinder. The pwm drive circuit 100 drives this brake cylinder control valve, generally designated 1, through its coil shown in FIG. 1b.

Referring still to FIG. 1a–b, a brake controller (not shown) or like device controls the overall function of the brake cylinder control valve 1 using the pwm drive circuit 100. The brake controller commands the pwm drive circuit to drive the brake cylinder valve 1 through an input voltage command signal $v_{com}$. The brake controller adjusts the input voltage command signal in response to feedback received from a pressure sensing or other device. This pressure sensing device senses the pressure within the particular brake cylinder or other pneumatic component whose pressure is to be controlled. Through this feedback, the brake controller functions as a closed loop control system through which it controls the operation of the pwm drive circuit 100 and ultimately the solenoid operated brake cylinder control valve 1.

The pwm drive circuit 100 includes a power supply filter and a power regulator, designated 110 and 120, respectively. The power supply filter may be implemented using any one of a variety of circuits whose configurations are well known in the electrical arts. The power supply filter 110 illustrated in FIG. 1a, for example, features commonly used components such as a diode D1, a series choke CK1 and a capacitor C2. Diode D1 connects at its anode to the battery power of the railway vehicle and at its cathode to one end of series choke CK1. Capacitor C2 connects between the other end of choke CK1 and ground. The choke in the circuit passes direct current to pwm drive circuit 100 while offering high impedance to pulsating or alternating currents. The node at which capacitor C2 and choke CK1 connect is the battery feed node B+ through which power supply filter 110 delivers battery feed voltage to pwm drive circuit 100.

The power regulator may be implemented using any one of a variety of circuits whose configurations are also well known in the electrical arts. The power regulator 120 illustrated in FIG. 2a, for example, features commonly used components such as an npn transistor Q7, a Zener diode Z4, an input filter inclusive of capacitors C7 and C8, an output filter inclusive of capacitor C4 and, optionally, a light emitting diode D6. Power regulator 120 reduces and regulates energy that it receives from the battery feed node B+ that it shares with power supply filter 110. Power regulator 120 supplies at its output terminal a regulated primary power level of approximately 18 volts dc to operate the various components of pwm drive circuit 100. Terminal TS1 6 serves as the battery return terminal B− for the circuit. On the input side of power regulator 120, transistor Q7 connects at its collector to the battery feed node B+ and at its base to Zener diode Z4 and capacitor C8 both of which connect at their opposite ends to ground. Resistor R27 connects across the collector and base of transistor Q7. Capacitor C7 connects across the battery feed node B+ and ground. On the output side of power regulator 120, capacitor C4 connects across the output terminal and ground. Light emitting diode D6, resistor R28 and Zener diode Z5 arranged in series likewise connect across the output of power regulator 120.

Capacitors C7 and C8 filter out the fluctuations in the battery feed voltage signal received from power supply filter 110. Resistor R27 is selected to bias properly the collector-base junction of transistor Q7 while Zener diode Z4 is selected to hold the base of transistor Q7 at a potential approximately 18 volts above that of the return terminal. Zener diode Z5 is used as a general purpose regulator and in conjunction with resistor R28 is selected to provide the desired voltage level at the output terminal and to set the current through light emitting diode D6 when transistor Q7 conducts. When power supply filter 110 supplies battery feed voltage to the battery feed node B+, transistor Q7 conducts. Capacitor C4 then filters out whatever fluctuations that may be present in the resulting output emanating from the emitter of transistor Q7. Notwithstanding the inherent voltage drop across the base-emitter junction of transistor Q7, Zener diode Z5 in series with resistor R28 and light emitting diode D6 assures that a regulated primary power level of approximately 18 volts dc is available from the output terminal of power regulator 120. Light emitting diode D6 will illuminate when power regulator 120 is actually regulating as is apparent from FIG. 2a.

The pwm drive circuit 100 features a pwm generator stage, an output stage and a feedback circuit, generally designated 200, 300 and 400, respectively. The feedback circuit 400 connects output stage 300 to pwm generator stage 200 through the second stage 235 of input control circuit 230. In particular, input control circuit 230 receives at op amp 236 a feedback signal from feedback circuit 400 through which to control pwm generator stage 200 and hence output stage 300 as more fully described below.

Figure 2B:
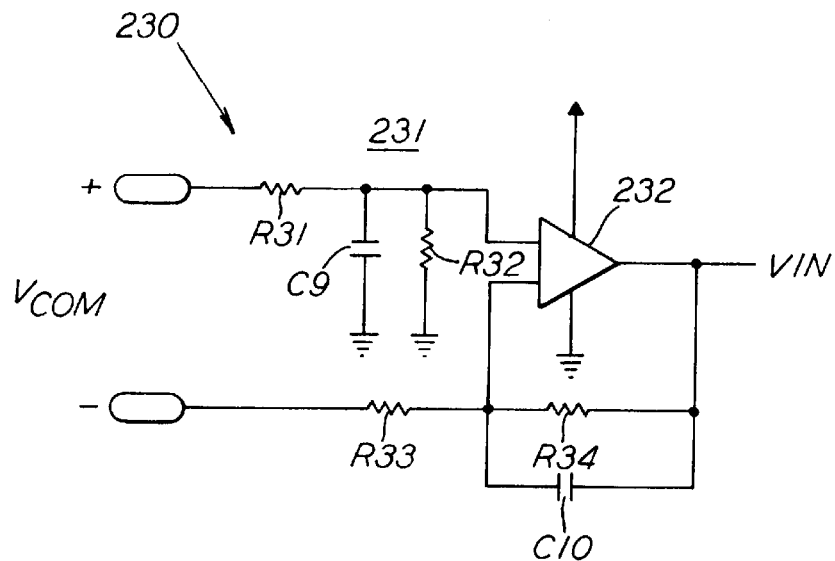
FIG. 2b is a schematic of a differential input amplifier circuit for the pulse width modulated drive circuit illustrated in FIGS. 1a and 1b.
Figure 2A:
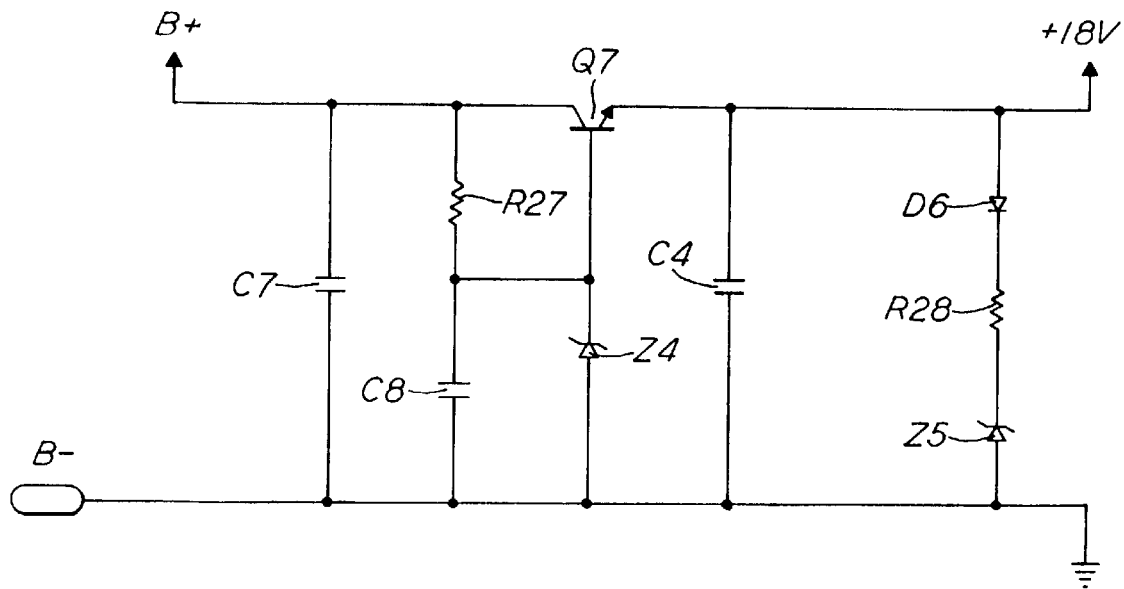
FIG. 2a is a schematic of a power regulating circuit for the pulse width modulated drive circuit shown in FIGS. 1a and 1b.

The pwm generator stage 200 includes a two stage input control circuit, generally designated 230, as shown in FIGS. 1a and 2b. The first stage of the input control circuit 230 features a differential input amplifier circuit 231 as shown in FIG. 2b. The second stage features an operational amplifier circuit 235 as shown in FIG. 1a. Returning to FIG. 2b, the amplifier circuit 231 features an op amp 232 and two inputs TS1 3 and TS1 4. Resistor R31 connects between input TS1 3 and the noninverting input of op amp 232 whereas resistor R32 and capacitor C9 each connect between ground and the noninverting input. Resistor R33 connects between input TS1 4 and the inverting input of op amp 232 whereas resistor R34 and capacitor C10 connect between the inverting input and the output $v_{in}$ of the amplifier circuit 231. At its input TS1 3, the differential amplifier circuit 231 receives the input voltage command signal $v_{com}$ from the brake controller. The output $v_{in}$ of the amplifier circuit 231 is proportional to the difference between the potential across the inputs TS1 3 and TS1 4. The output $v_{in}$ of amplifier circuit 231 is an input to the second stage 235 of input control circuit 230 shown in FIG. 1a.

The second stage 235 of the input control circuit 230 includes a voltage divider featuring resistors R5 and R6 and an operational amplifier 236. The input $v_{in}$ to the second stage 235 is applied to resistor R5 so that through the voltage divider an operating voltage that varies with the input voltage command signal $v_{com}$ from the brake controller is applied to the noninverting input of op amp 236 of input control circuit 230. From the ensuing description it will become apparent that the operation of pwm drive circuit 100 depends upon the operating voltage applied to this noninverting input. For this reason the noninverting input of op amp 236 may also be referred to as the control node, denoted CN in FIGS. 1a and 3b.

The pwm generator stage may be implemented using any one of a variety of circuits whose configurations are well known in the electrical arts. The pwm generator stage 200 illustrated in FIG. 1a, for example, further includes a pwm chip 220 and a frequency control circuit 210. The pwm chip 220 may take the form of any one of a variety of commercially available chips such as an LM1524D. This pwm chip is a standard chip used for implementing a pulse width modulation generator. Another pwm chip that may be used is a TL494 chip for an alternative embodiment of the present invention shown in FIG. 4. It should be apparent to practitioners of ordinary skill in the relevant art that the type of pwm chip selected ultimately dictates other aspects of circuit design such as the type of biasing arrangement or external input amplifier, if any, required to make the selected pwm chip operate properly within the present invention. It should be understood, therefore, that the choice of the LM1524D for use in the pwm drive circuit 100 described in this document is for illustrative purposes only and not intended to limit the invention to that choice.

The operation of the pwm chip 220 depends upon frequency control circuit 210 and input control circuit 230. As shown in FIG. 1a, frequency control circuit 210 includes resistor R2 and capacitor C1 whose values control the frequency of the pulses within the pwm signal generated by the pwm chip 220. Resistor R2 connects between pin 6 of pwm chip 220 and ground whereas capacitor C1 connects between pin 7 and ground. The values of these components are preferably selected so that the response of valve 1 to the input voltage command signal $v_{com}$ is optimized. Some deviation from this optimal frequency, however, will not adversely affect the operation of pwm drive circuit 100. Accordingly, resistor R2 and capacitor C1 need not meet extremely strict tolerances.

The pwm generator stage 200 is ultimately controlled by the input it receives from input control circuit 230. Specifically, pwm chip 220 receives at its pin 9 the output of op amp 236 of input control circuit 230. When the control voltage $v_{pwmc}$ at pin 9 is approximately 1 v dc, pwm chip 220 emits from connected pins 11 and 14 a pwm signal exhibiting a duty cycle of approximately zero percent. When the voltage $v_{pwmc}$ at pin 9 is approximately 4 v dc, pwm chip 220 emits a pwm signal exhibiting a duty cycle of nearly one hundred percent. Through its pwm signal, pwm generator stage 200 drives the output stage 300.

The output stage 300 of pwm drive circuit 100 includes a switching circuit 310 and a coil driver circuit 320. The switching circuit 310 features a biasing circuit composed of resistors R7 and R8, an n-channel field effect transistor Q3, a voltage divider composed of resistors R10 and R11, an npn transistor Q1, a pnp transistor Q2 and a voltage offset circuit 312 as more fully explained below. The pwm signal emitted from pwm chip 220 is fed to resistor R7 of the biasing circuit. Resistor R7 connects to the gate of transistor Q3 and in conjunction with resistor R8 is used to bias transistor Q3 so it can be driven by the pwm signal. Resistors R7 and R8 allows pwm chip 220 to switch transistor Q3 between the off and on states.

Transistors Q1 and Q2 are arranged in a totem pole configuration with the emitter of Q1 connected to the emitter of Q2. The bases of transistors Q1 and Q2 share a node with the junction of resistors R10 and R11 of the voltage divider. Transistor Q1 connects at its collector to the battery feed node. Transistor Q2 connects at its collector to the voltage offset circuit 312 which offsets the totem pole configured transistors from ground. Diode D2 connects across the base and collector of transistor Q2 and allows the totem pole configured transistors Q1 and Q2 to operate if the battery feed voltage drops quite low. The voltage offset circuit 312 holds the potential at the collector of transistor Q2 to a preset desired level of preferably 10 volts below that of battery feed voltage. The preset desired voltage at which the collector is held depends upon the values of the components in the voltage offset circuit, namely, capacitor C3, Zener diode Z1 and resistor R12. The output of switching circuit 310 emanates from node N1 where the emitter of npn transistor Q1 connects to the emitter of pnp transistor Q2. It is at node N1 that switching circuit 310 feeds into coil driver circuit 320.

The coil driver circuit 320 of output stage 300 features a biasing circuit composed of resistor R13, a p-channel field effect transistor Q5, a Zener diode Z2, a bidirectional Zener diode VR1 and a pair of freewheeling diodes D3. As illustrated in FIG. 1b, resistor R13 connects between node N1 and the gate of transistor Q5. Resistor R16 connects between battery feed voltage and node N2 at which the source of transistor Q5 connects to the cathode of diode Z2. Resistor R16 serves in part to bias the connection between the battery feed and the source of transistor Q5. Zener diode Z2 connects across the gate and source of transistor Q5 to make sure the gate to source voltage does not exceed a limit inherent to transistor Q5. This protects transistor Q5 from various adverse electrical influences including any excessive transients in battery feed voltage. Bidirectional Zener diode VR1 connects between node N2 and node N3, i.e., across transistor Q5 from source to drain. Diode VR1 protects transistor Q5 from various adverse electrical influences including transients from the battery feed node and the inductive kick from the coil of the brake cylinder control valve 1 to be controlled. The coil as an inductive device temporarily stores energy when energized by battery feed voltage via transistor Q5. When the coil deenergizes, the residual energy if allowed to flow back uninhibited into the driver circuit might damage transistor Q5. Freewheeling diodes D3 connect in parallel circuit relationship to each other and to the coil 1 of the brake cylinder valve. Connected between ground and the drain of transistor Q5 at node N3 on the high side of the coil, diodes D3 protect the coil from inductive kickback and allow current to flow through resistor R17 even when transistor Q5 is off. Freewheeling diodes D3 limit transients as the coil is being alternately energized and deenergized quickly.

Referring now to FIGS. 1a–b, feedback circuit 400 includes current sense resistor R17, resistor R15, capacitor C5, a unity gain op amp 410, resistor R9, potentiometer R25 and resistor R3. Current sense resistor R17 connects between ground and the low side of coil 1. Resistor R15 connects at one end to the noninverting input of op amp 410 and at its other end to current sense resistor R17. Capacitor C5 connects between the noninverting input and ground. Op amp 410 connects at its output to its inverting input. Resistor R9 connects in series between the output of op amp 410 and a feedback node FN common to one end of potentiometer R25 and the inverting input of op amp 236. Resistor R3 connects between the other end of potentiometer R25 and a node shared by the output of pin 9 of pwm chip 220 and the output of op amp 236 of input control circuit 230. It is through this feedback node FN that feedback circuit 400 feeds its feedback signal to input control circuit 230 and thereby affects the operation pwm generator stage 200 and output stage 300 as described below.

The brake controller commands the pwm drive circuit through the input voltage command signal $v_{com}$ as shown in FIG. 2b. The output $v_{in}$ of amplifier circuit 231 corresponds proportionally to this input voltage command signal. Furthermore, there is a positive linear relationship between the input $v_{IN}$ to second stage 235 and the voltage $v_{pwmc}$ received at input pin 9 of pwm chip 220 shown in FIG. 1a. Specifically, given component values appropriate for FIGS. 1a–b, when input $v_{IN}$ to second stage 235 is approximately 0 volts dc, pwm chip 220 receives at its pin 9 input a voltage $v_{pwmc}$ of approximately 1 v dc and emits from its output little or no pwm signal. When voltage $v_{IN}$ is approximately 5 volts, pwm chip 220 receives a voltage $v_{pwmc}$ of approximately 2.5 volts and emits a pwm signal having a duty cycle of approximately fifty percent. When voltage $v_{IN}$ is approximately 10 volts, pwm chip 220 receives a voltage $v_{pwmc}$ of approximately 4 volts and outputs a pwm signal having a duty cycle of nearly one hundred percent.

Regarding the operation of pwm drive circuit 100, the pwm generator stage 200 feeds into the switching circuit 310 of output stage 300. Specifically, absent a pulse from pwm generator stage 200, no voltage is provided to the gate of transistor Q3 through biasing resistors R7 and R8. Transistor Q3 does not conduct and allows no current to flow from the battery feed node through resistors R10 and R11 towards ground. While transistor Q3 is turned off, the voltage divider of R10 and R11 biases the bases of transistors Q1 and Q2 so as to turn on npn transistor Q1 and turn off pnp transistor Q2. Battery feed voltage will be supplied via transistor Q1 and biasing resistor R13 to the gate of transistor Q5. This battery feed voltage is sufficiently high to turn off transistor Q5 as it is a p-channel field effect transistor. While transistor Q5 is turned off, no source of energy will be supplied via coil driver circuit 320 to the coil of valve 1.

When pwm generator stage 200 outputs a pwm signal, the gate of transistor Q3 receives a voltage of approximately 10 v for the duration of each pulse. Each time a pulse appears at its gate, transistor Q3 conducts and allows current to flow from the battery feed node through resistors R10 and R11 towards ground. The voltage at the bases of transistors Q1 and Q2 is pulled low through voltage dividing resistors R10 and R11 and transistor Q3 so as to turn off npn transistor Q1 and turn on pnp transistor Q2. While transistor Q2 conducts, the gate of transistor Q5 will be at approximately the voltage level determined by the voltage offset circuit 312. This voltage level is sufficient to turn on transistor Q5 as it is a p-channel field effect transistor. While transistor Q5 is turned on, the output stage 300 supplies battery feed voltage through its coil driver circuit 320 to the coil of brake cylinder control valve 1.

During operation of the present invention, coil driver circuit 320 applies the battery feed voltage to the coil in the form of a pwm output signal whose pulses have a duration that generally match those received from pwm generator stage 200. The coil responds by producing a force on the valve spool that is directly proportional to the average current contained with the pulses it receives from coil driver circuit 320. When pwm generator stage 200 delivers no pwm signal to output stage 300, the coil driver circuit 320 applies no pwm output signal across the coil. With the coil deenergized, the brake cylinder control valve 1 thus remains in the fully applied position. When pwm generator stage 200 delivers a 50% duty cycle pwm signal to output stage 300, the coil driver circuit 320 applies a pwm output signal of equal duty cycle across the coil. As long as the battery is operating normally, this is usually sufficient to move the spool of valve 1 to the fully released position. It is the brake controller, of course, that ultimately controls the position of the valve spool through the input voltage command signal $v_{com}$ as shown in FIG. 2b.

Increasing the pwm output signal across the coil from 0% to 50% duty cycle is usually sufficient to move the brake cylinder control valve from the fully applied to the fully released position during normal operation. Occasionally, however, the valve spool may become sluggish or even stuck. The brake controller can determine when the valve spool is sluggish or otherwise impeded from the feedback it receives from the pressure sensor that monitors pressure within the brake cylinder. If the valve spool does indeed become impeded, the brake controller will deliver an input command signal $v_{com}$ through which it commands pwm drive circuit 100 to deliver to the coil a pwm output signal having anywhere from 51% to a 100% duty cycle. The exact duty cycle depends, of course, upon the aforementioned feedback. This 51–100% range is available to the brake controller to provide extra energy to the coil should the function of the valve spool become impeded. Once the brake controller receives feedback confirming that the pressure within the brake cylinder or other desired volume has achieved the commanded level, the duty cycle of the pwm output signal is returned to the normal range.

Refer now to feedback control circuit 400 illustrated in FIGS. 1a–b. Feedback circuit 400 provides to the input control circuit 230 a feedback signal indicative of state of the coil. Specifically, the current flowing through the coil of valve 1 also flows into current sense resistor R17. Resistor R17 thus provides a good means to measure the actual voltage applied across the coil 1 due to the pwm output signal. The RC filter composed of resistor R15 and capacitor C5 filters from the feedback signal whatever ac components it may be carrying. The op amp 410 then senses this feedback voltage at its noninverting input at current sense node CS. The op amp 410 amplifies this feedback voltage signal and supplies it to resistor R9. The feedback signal then flows through resistor R9 to the inverting input of op amp 236 and to potentiometer R25 through resistor R3 to the input of pwm chip 220. By providing this feedback signal to input control circuit 230, feedback circuit 400 permits pwm drive circuit 100 to drive effectively the valve 1 even when the battery feed voltage drops.

Feedback circuit 400 ultimately affects the input supplied to the pwm chip 220 of pwm generator stage 200. If the battery feed voltage drops low, for example, then the voltage $v_{pwmc}$ applied to the input of pwm chip 220 is increased to a magnitude appropriate to drive the valve to the desired state. Specifically, the pwm drive circuit 100 compensates for low battery voltage by increasing the duty cycle of the pwm output signal applied across the coil 1. As low battery feed voltage decreases the magnitude of each of the pulses in the pwm output signal, the pwm generator stage 200 broadens the width of the pulses to compensate. This allows for sufficient energy to be delivered to the coil 1 thereby enabling it to produce force sufficient to move the valve spool to the desired position. Potentiometer R25 in feedback circuit 400 may be used to adjust this output force slightly. Note also that as the effective resistance of coil 1 increases as it heats up, the current sense resistor R17 of feedback circuit 400 detects this through a corresponding decrease in current through the coil. Through feedback circuit 400, pwm generator stage 200 responds accordingly to increase the duty cycle to compensate for this heat related loss in energy delivered to the coil.

Another feature of the pwm drive circuit 100 is a current limiter circuit which serves to protect output stage 300 against excessive current that would otherwise damage coil driver circuit 320. Such a current could develop, for example, if the coil of the solenoid operated valve 1 were to short circuit. The current limiter circuit may be implemented using any one of a variety of circuits whose configurations are well known in the electrical arts. The current limiter circuit 330 illustrated in FIG. 1b, for example, features commonly used components such as a pnp bipolar junction transistor Q4, an npn bipolar junction transistor Q6, a voltage divider inclusive of resistors R14 and R26 and a diode D7. It also includes resistor R16 on the high side of the transistor Q5. Specifically, resistor R16 connects between battery feed node and node N2 at which unite the source of transistor Q5, the cathode of diode Z2 and the base of transistor Q4. Transistor Q4 at its emitter connects to the battery feed node and at its collector connects to one side of resistor R14. Transistor Q6 at its collector connects to diode d7 and at its base connects to the other end of resistor R14. Resistor R26 connects between ground and a node shared by the base of transistor Q6 and the other end of resistor R14. Diode D7 connects at its cathode to the collector of transistor Q6 and at its anode to the control node CN of the input control circuit 230.

Regarding the operation of current limiter circuit 330, it is apparent that the current flowing through resistor R16 will be nearly the same as that flowing through the coil of brake cylinder control valve 1. When the current through resistor R16 exceeds a predetermined maximum value, resistor R16 drops the battery feed voltage to a level at node N2 sufficiently low enough to turn on pnp transistor Q4. This sets up a voltage divider whose resistors R14 and R26 provide a sufficiently large enough voltage to activate npn transistor Q6. When transistor Q6 turns on, current is free to flow from its collector to its emitter thereby reducing the voltage at the anode of diode D7 to a potential basically equivalent to the voltage drop across diode D7 combined with the voltage drop across the collector-emitter junction of transistor Q6. The combined voltage drop, of course, is a value inherent to the particular semiconductor devices selected for diode D7 and transistor Q6. Because the control node CN of input control circuit 230 connects both to the anode of diode D7 and (via resistor R5) to the output $v_{IN}$ of amplifier circuit 231, whenever the current through resistor R16 exceeds the predetermined maximum, transistors Q4 and Q6 will turn on. This will reduce whatever operating voltage that amplifier circuit 231 is then applying on the control node CN to a level equaling the combined voltage drop. When current limiter circuit 330 reduces the operating voltage at the noninverting input of op amp 236 to such a low level, the duty cycle of the pwm signal emitted from pwm chip 220 will be reduced to a predetermined level, preferably approximately 5% or lower. Current limiter circuit 330 thus tends to act like a shutdown circuit that essentially shuts down pwm generator stage 200 when excessively high and potentially damaging current begins to flow through resistor R16 and coil driver circuit 320.

It should be apparent that current limiter circuit 330 allows the pwm drive circuit 100 to compensate for excessively high battery feed voltage whereas the feedback circuit 400 allows the pwm drive circuit 100 to compensate for low battery feed voltage or even modest increases. Specifically, current limiter circuit 330 tends to shut down the pwm drive circuit in response to excessive surges in battery voltage. Conversely, feedback circuit 400 tends to increase the duty cycle of the pwm output signal applied across the coil in response to a decrease in battery voltage.

Another preferred feature of the present invention is a duty cycle limit timer circuit which serves to limit the time that pwm drive circuit 100 operates above a prespecified percentage of duty cycle. The duty cycle limit timer circuit accomplishes this by affecting the operating voltage at the control node CN of input control circuit 230. The duty cycle limit timer circuit 500 illustrated in FIG. 3a, for example, includes an operational amplifier 510, a charging RC circuit and a discharging RC circuit. The charging RC circuit features resistor R20, diode D5 and capacitor C6 and the discharging RC circuit features capacitor C6, resistor R21 and diode D4. Resistor R20 connects in series with diode D5 while resistor R21 connects in series with diode D4. The output of op amp 510 connects at its output to both resistor R20 and the cathode of diode D4. Capacitor C6 connects between ground and a node shared by resistor R21 and the cathode of diode D5. Resistors R18 and R19 are connected in series between the battery feed node and ground. Op amp 510 connects at its inverting input to the junction of voltage dividing resistors R18 and R19 and at its noninverting input to the current sense node CS within feedback circuit 400 shown in FIGS. 1a–b.

Figure 3A:
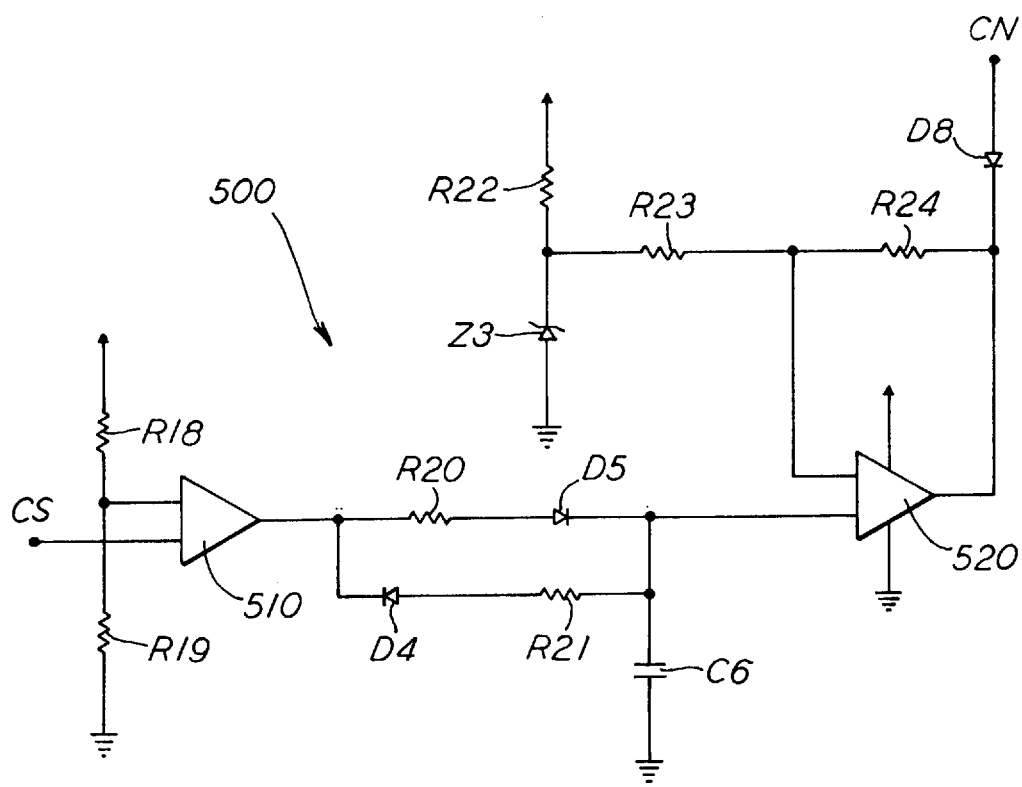
FIG. 3a is a schematic of a duty cycle limit timer circuit of the pulse width modulated drive circuit illustrated in FIGS. 1a and 1b.

The timer circuit 500 also includes operational amplifier 520 and diode D8 as shown in FIG. 3a. Resistors R22 and R23 connect in series between the battery feed node and the noninverting input of op amp 520, with Zener diode Z3 connected between ground and the junction of resistors R22 and R23. Diode Z3 assures that the voltage at that junction will not exceed a certain level. Resistors R22 and R23 along with diode Z3 tend to hold the voltage at the noninverting input of op amp 520 to a relatively constant level. Diode D8 connects at its cathode to the output of op amp 520. Moreover, like diode D7 of current limiter circuit 330, diode D8 connects at its anode to the control node CN of input control circuit 230. Resistor R24 connects across the output and noninverting input of op amp 520 for biasing purposes. The inverting input of op amp 520 connects to capacitor C6 at the node shared by resistor R21 and the cathode of diode D5 as shown in FIG. 3a.

The timer circuit 500 senses the feedback voltage at current sense node CS within feedback circuit 400 shown in FIGS. 1a–b and 3a. This would give a fairly good approximation of the current flowing through the coil of the solenoid valve 1 to be controlled. Once the feedback voltage at current sense node CS exceeds the voltage set up by voltage dividing resistors R18 and R19 at the inverting input of op amp 510, the output of op amp 510 goes high. The values of resistors R18 and R19 should be selected so that the output of op amp 510 goes high when the pwm output signal across the coil exceeds a prespecified percentage of duty cycle. Preferably, the prespecified percentage is approximately 75% duty cycle (i.e., when the pulse width is 75% of maximum).

The timer circuit 500, however, will not deactivate pwm drive circuit 100 until after the duty cycle of the pwm output signal has exceeded the prespecified percentage for a preset charging time inherent to the charging RC circuit. Specifically, when the duty cycle of the pwm output signal exceeds this prespecified percentage, the output of op amp 510 goes high. Capacitor C6 then takes the charging time to charge to a predetermined voltage through resistor R20 and diode D5 thereby also raising the potential at the inverting input of op amp 520 to the predetermined voltage. Given the relative voltage levels at the inputs of op amp 520, the output of op amp 520 goes low. Diode D8 will then conduct thereby dropping whatever operating voltage that amplifier circuit 231 is then applying on the control node CN. This temporarily deactivates pwm drive circuit 100 thereby causing the feedback voltage at current sense node CS to fall to zero.

The pwm drive circuit 100 will remain deactivated for a preselected discharging time inherent to the discharging RC circuit. Specifically, the control node CN of input control circuit 300 will remain low until capacitor C6 discharges through resistor R21 and diode D4. When capacitor C6 discharges, the potential at the inverting input of op amp 520 is reduced accordingly. Given the voltage levels now at the inputs of op amp 520, the output of op amp 520 again goes high. Diode D8 then can no longer conduct thereby leaving unaffected the operating voltage at control node CN of input control circuit 230.

The duty cycle limit timer circuit thus serves as a temporary shutdown circuit similar to the current limiter circuit. Its function, however, is dependent on the duty cycle of the pwm signal output rather than the current flowing through the coil. It should also be noted that the charging and discharging times of the charging and the discharging RC circuits, respectively, are preferably selected to be approximately the same. Assuming thirty second charging times are preferable, the duty cycle limit timer circuit would not deactivate pwm drive circuit 100 until after the duty cycle exceeded the prespecified percentage for thirty seconds. Once the pwm drive circuit 100 is deactivated, the timer circuit will reactivate pwm drive circuit 100 only after thirty seconds.

Figure 3B:
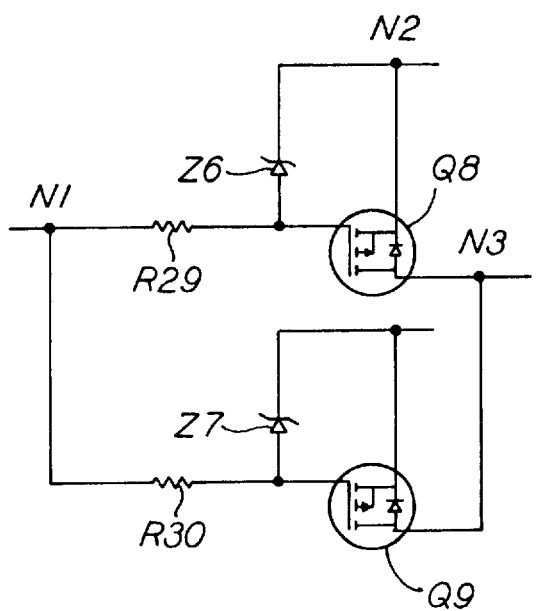
FIG. 3b is a schematic of two driver FET circuits that preferably connect in parallel circuit relationship with the driver FET circuit of the pulse width modulated drive circuit illustrated in FIGS. 1a and 1b.

Another preferred feature of the pwm drive circuit 100 is a pair of driver transistor circuits shown in FIG. 3b. Coil driver circuit 320 of output stage 300 preferably includes these two driver transistor circuits in addition to the driver transistor circuit composed of resistor R13, Zener diode Z2 and transistor Q5 shown in FIG. 1b. This preferred coil driver circuit will generate less heat and dissipate less power than one equipped with only one driver transistor circuit. The pwm drive circuit equipped with the preferred coil driver circuit will therefore exhibit greater reliability.

Referring again to FIG. 3b, the pair of driver transistor circuits includes p-channel field effect transistors Q8 and Q9 with their associated biasing resistors R29 and R30 and Zener diodes Z6 and Z7. They are connected in parallel circuit relationship with each other and with the driver transistor circuit shown in FIG. 1b. Specifically, like biasing resistor R13, biasing resistors R29 and R30 each connect at one end to node N1 at the output of switching circuit 310. Like transistor Q5, transistors Q8 and Q9 each connect at their source terminals to node N2 and at their drain terminals to node N3. The gate of transistor Q8 connects to the other end of resistor R29 and the gate of transistor Q9 connects to the other end of resistor R30. Zener diode Z6 connects across the gate and source of transistor Q8. Likewise, Zener diode Z7 connects across the gate and source of transistor Q9. Like diode Z2, diodes Z6 and Z7 provide over voltage protection through which the gate to source voltage will not exceed a limit inherent to those transistors. In this preferred coil driver circuit, bidirectional Zener diode VR1 still connects between nodes N2 and N3. Diode VR1 protects each driver transistor from adverse electrical influences including transients in battery feed voltage and the inductive kick from the coil of the particular brake cylinder control valve 1 to be controlled.

Figure 4:
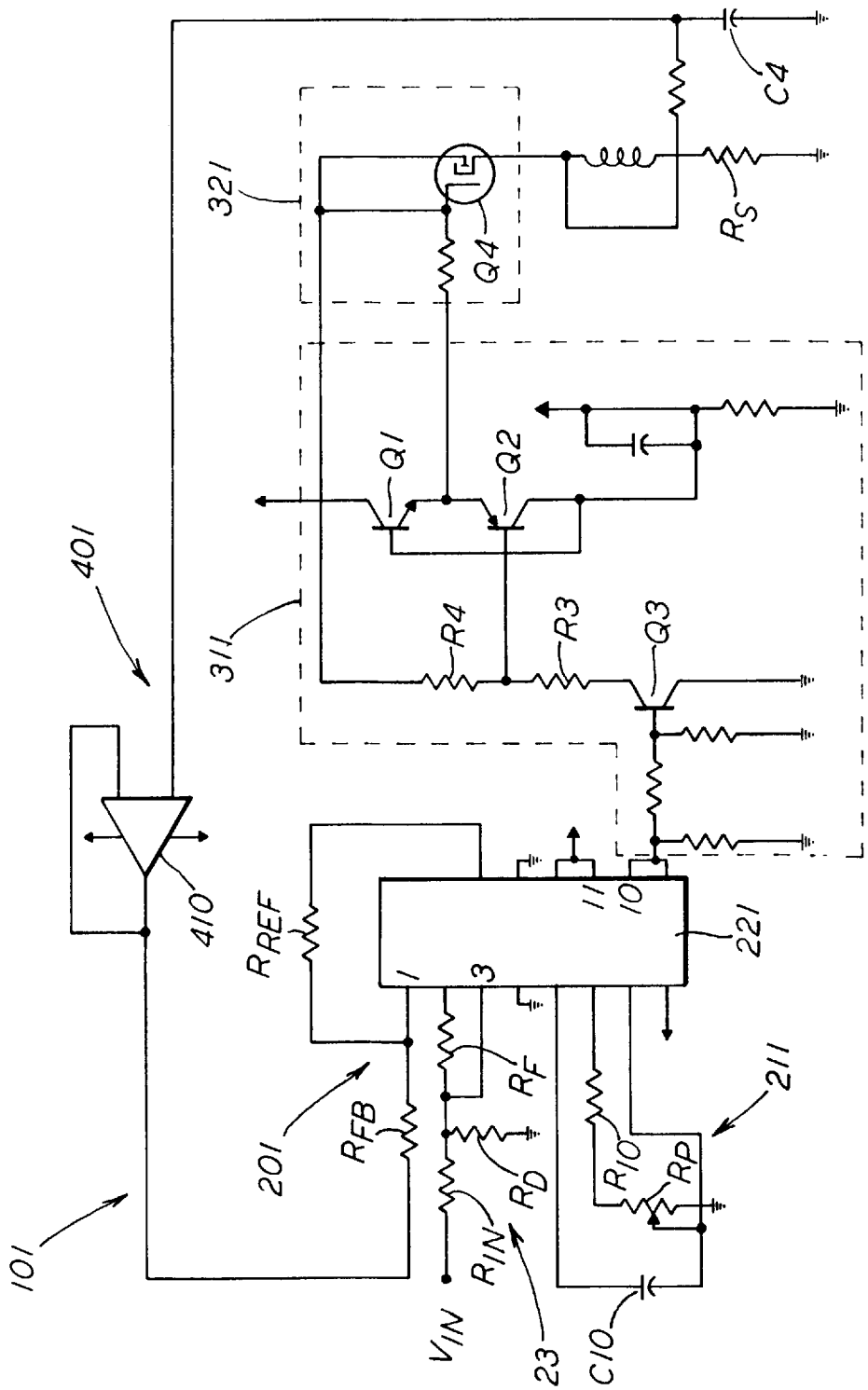
FIG. 4 is a schematic of an alternative embodiment of the pulse width modulated drive circuit according to the present invention.

FIG. 4 illustrates the essential details of a second embodiment of a pulse width modulated drive circuit, generally designated 101. Like the pwm drive circuit of FIGS. 1a–b through 3, pwm drive circuit 101 may be used to drive a variety of solenoid operated valves such as the infinitely variable brake cylinder control valve 1 discussed previously in this document.

The brake controller or like device controls the overall function of the brake cylinder control valve 1 using the pwm drive circuit 101. The brake controller ultimately commands the pwm drive circuit to drive the brake cylinder valve 1 through the signal $v_{in}$. The brake controller ultimately adjusts this signal $v_{in}$ in response to feedback received from a pressure sensing or other device. This pressure sensing device senses the pressure within the particular brake cylinder or other pneumatic component whose pressure is to be controlled. Through this feedback, the brake controller functions as a closed loop control system through which it controls the operation of the pwm drive circuit 101 and ultimately the solenoid operated brake cylinder control valve 1.

The pwm drive circuit 101 includes a pwm generator stage, an output stage and a feedback circuit, generally designated 201, 301 and 401, respectively. The feedback circuit 401 connects output stage 301 to pwm generator stage 201 through which to control pwm generator stage 201 and hence output stage 301 as more fully described below.

The pwm generator stage 200 includes a pwm chip 221 and a frequency control circuit 211. The pwm chip 221 may take the form of any one of a variety of commercially available chips such as a TL494. This pwm chip is a standard chip used for implementing a pulse width modulation generator. The type of pwm chip selected ultimately dictates other aspects of circuit design such as the type of biasing arrangement or external input amplifier, if any, required to make the selected pwm chip operate properly within the present invention. The choice of the TL494 chip in this second embodiment is for illustrative purposes only and not intended to limit the invention to that choice.

The pwm generator stage 201 further includes an input control circuit 23. The input control circuit includes resistors $R_{IN}$, $R_O$, and $R_F$ and receives an input signal $v_{in}$ preferably ranging between 0 to 10 volts dc that is supplied ultimately from the brake controller. The input signal $v_{in}$ is applied to resistor $R_{IN}$ so that through the input control circuit 23 a control voltage $v_{pwmc}$ is applied to input pin 3 of pwm chip 221. From the ensuing description it will become apparent that the operation of pwm drive circuit 100 depends upon the control voltage applied to this input.

The operation of the pwm chip 221 depends upon frequency control circuit 211 and the inputs it receives from input control circuit 23 and feedback circuit 401. As shown in FIG. 4, frequency control circuit 211 includes resistor R10, capacitor C10 and potentiometer $R_P$ whose values control the frequency of the pulses within the pwm signal generated by the pwm chip 221. The values of these components are preferably selected so that the response of valve 1 to the input signal $v_{IN}$ is optimized. Some deviation from this optimal frequency, however, will not adversely affect the operation of pwm drive circuit 101. Potentiometer $R_P$ in feedback circuit 401 may be used to adjust slightly the frequency.

The pwm generator stage 201 is ultimately controlled by the input it receives from input control circuit 23. Specifically, given component values appropriate for FIG. 4, when the input signal $v_{IN}$ is approximately 0 volts dc, pwm chip 221 receives at its input pin 3 a voltage $v_{pwmc}$ of approximately 3.5 v dc and emits from connected pins 9 and 10 a pwm signal exhibiting a duty cycle of approximately zero percent. When the input signal $v_{IN}$ is approximately 10 volts dc, pwm chip 221 receives at its input a voltage $v_{pwmc}$ of approximately 3.5 v dc and emits from its output a pwm signal exhibiting a duty cycle of nearly one hundred percent. Pwm generator stage 201 drives output stage 301 via the pwm signal.

The output stage 301 of pwm drive circuit 101 includes a switching circuit 311 and a coil driver circuit 321 each of which perform essentially the same function as switching circuit 310 and coil driver circuit 320 of the preferred embodiment described previously. The feedback circuit 401 that connects the output of coil driver circuit 321 and pwm generator stage 201 also performs essentially the same function as feedback circuit 400 of the preferred embodiment described above. Feedback circuit 401 in the second embodiment includes current sense resistor $R_S$, an RC filter composed of resistor R8 and capacitor C4, a unity gain op amp 410 and a resistor $R_{FB}$. Its feedback voltage signal, however, ultimately feeds back to pin 1 of pwm chip 221 rather than to input control circuit 23.

The brake controller ultimately commands the pwm drive circuit 101 to drive the brake cylinder valve 1 through the signal $v_{in}$. Unlike with the LM1524D chip described previously, however, there is a negative linear relationship between the input signal $v_{IN}$ and the control voltage $v_{pwmc}$ received at input pin of pwm chip 221. Specifically, given component values appropriate for FIG. 4, when input signal $v_{IN}$ is approximately 0 volts dc, pwm chip 221 receives at its pin 3 input a voltage $v_{pwmc}$ of approximately 3.5 v dc and emits from its output little or no pwm signal. When voltage $v_{IN}$ is approximately 5 volts, pwm chip 221 receives a voltage $v_{pwmc}$ of approximately 2.6 volts and emits a pwm signal having a duty cycle of approximately fifty percent. When voltage $v_{IN}$ is approximately 10 volts, pwm chip 221 receives a voltage $v_{pwmc}$ of approximately 0.8 volts and outputs a pwm signal having a duty cycle of nearly one hundred percent.

Although FIG. 4 does not illustrate a current limiter circuit or a duty cycle limit timer circuit, the second embodiment of the present invention preferably includes these two features. Due to the differences in circuit design between the first and second embodiments, obvious modifications to these two circuits may be necessary to incorporate them into pwm drive circuit 101.

Despite the cited differences in overall circuit design between the two embodiments of the present invention, it should be apparent to persons skilled in the relevant art that the respective pwm drive circuits 100 and 101 operate essentially identically. Persons of such skill will then readily be able to understand the operation of this second embodiment by reference to the detailed explanation of the operation of the presently preferred first embodiment of the present invention.

While the presently preferred and alternative embodiments for carrying out the present invention has been set forth in detail according to the Patent Act, those persons of ordinary skill in the technical art to which this invention pertains will recognize various alternative ways of practicing the invention without departing from the spirit and scope of the appended claims. Those of ordinary skill will also recognize that the foregoing description is merely illustrative and is not intended to limit any of the following claims to any particular narrow interpretation.

Accordingly, to promote the progress of science and useful arts, we secure for ourselves by Letters Patent exclusive rights to all subject matter embraced by the following claims for the time prescribed by the Patent Act.

We claim:

1. A pulse width modulated drive circuit for driving a solenoid operated valve in response to an input voltage signal from a brake control apparatus, said solenoid operated valve including a coil that is energizable in response to energy received from said drive circuit, said drive circuit comprising:

(a) a pulse generator circuit for receiving said input voltage signal from said brake control apparatus and a feedback signal derived from said coil and for generating in response thereto a pulse width modulated signal whose duty cycle depends thereon;

(b) an output circuit for receiving said pulse width modulated signal from said pulse generator circuit and for generating in response thereto a pulse width modulated output signal whose duty cycle matches that of said pulse width modulated signal through which energy from a source of energy is delivered to said coil so as to control operation of said solenoid operated valve thereby controlling operation of said brake control apparatus; and (c) a feedback circuit, disposed between said coil and said pulse generator circuit, for generating said feedback signal thereby enabling said pulse generator circuit to adjust said pulse width modulated signal to compensate for variations in energy supplied by said source of energy.

2. The pulse width modulated drive circuit recited in claim 1 further comprising a current limiter circuit for reducing the duty cycle of said pulse width modulated signal to a predetermined level when current supplied by said output circuit to said coil exceeds a predetermined maximum value thereby protecting said output circuit from potentially damaging current.

3. The pulse width modulated drive circuit recited in claim 1 further comprising a duty cycle limit timer circuit for deactivating said pwm drive circuit for a preselected period of time after the duty cycle of said pulse width modulated output signal has exceeded a prespecified percentage for a preset period of time.

4. The pulse width modulated drive circuit recited in claim 3 wherein said preselected and preset periods of time are approximately identical.

5. The pulse width modulated drive circuit recited in claim 1 wherein said pulse generator circuit includes:

(a) an input control circuit for receiving said input voltage signal from said brake control apparatus and said feedback signal derived from said coil and for generating in response thereto a control voltage based thereon;

(b) a pwm chip for receiving said control voltage from said input control circuit and for generating in response thereto said pulse width modulated signal whose duty cycle depends thereon; and (c) a frequency control circuit for setting the frequency of the pulses carried by said pulse width modulated signal generated by said pwm chip.

6. The pulse width modulated drive circuit recited in claim 5 wherein said output circuit includes:

(a) a switching circuit for activation by said pulse width modulated signal received from said pwm chip; and (b) a coil driver circuit driven by said switching circuit; such that when said switching circuit is activated, said switching circuit drives said coil driver circuit so that said coil driver circuit generates said pulse width modulated output signal through which energy from said source of energy is delivered to said coil.

7. The pulse width modulated drive circuit recited in claim 6 wherein said coil driver circuit includes a driver transistor circuit by which to switch via said pulse width modulated output signal energy from said source of energy to said coil when driven by said switching circuit.

8. The pulse width modulated drive circuit recited in claim 6 wherein said coil driver circuit includes a plurality of driver transistor circuits connected in parallel circuit relationship with each other between said switching circuit, said source of energy and said coil by which to switch via said pulse width modulated output signal energy from said source of energy to said coil when driven by said switching circuit.

9. The pulse width modulated drive circuit recited in claim 6 wherein said output circuit includes a bidirectional Zener diode connected across said coil driver circuit to protect said coil driver circuit from adverse electrical influences.

10. The pulse width modulated drive circuit recited in claim 6 wherein said output circuit includes a pair of freewheeling diodes connected in parallel circuit relationship to each other and across said coil to protect said coil from adverse electrical influences.

11. The pulse width modulated drive circuit recited in claim 6 further comprising a current limiter circuit connected between said coil driver circuit and said input control circuit for affecting said control voltage input to said pwm chip such that when current supplied by said coil driver circuit to said coil exceeds a predetermined maximum value the duty cycle of said pulse width modulated signal reduces to a predetermined level thereby protecting said coil driver circuit from potentially damaging current.

12. The pulse width modulated drive circuit recited in claim 6 further comprising a duty cycle limit timer circuit connected between said coil and said input control circuit for affecting said control voltage input to said pwm chip such that when the duty cycle of said pulse width modulated output signal has exceeded a prespecified percentage for a preset period of time said duty cycle limit timer circuit deactivates said pwm drive circuit for a preselected period of time.

13. The pulse width modulated drive circuit recited in claim 12 wherein said preselected and preset periods of time are approximately identical.

14. The pulse width modulated drive circuit recited in claim 1 further comprising a power supply filter for filtering alternating currents from a power supply thereby providing said source of energy for said pwm drive circuit.

15. The pulse width modulated drive circuit recited in claim 14 further comprising a power regulator for reducing and regulating energy received from said source of energy to a primary power level usable for operation of the various components of said pwm drive circuit.

16. A pulse width modulated drive circuit for driving a solenoid operated valve in response to an input voltage signal from a brake control apparatus, said solenoid operated valve including a coil that is energizable in response to energy received from said drive circuit, said drive circuit comprising:

(a) a pulse generating means for receiving said input voltage signal from said brake control apparatus and a feedback signal derived from said coil which ultimately combine to form a control voltage in response to which said pulse generating means generates a pulse width modulated signal whose duty cycle depends thereon;

(b) an output means for receiving said pulse width modulated signal from said pulse generating means and for generating in response thereto a pulse width modulated output signal having pulse width generally proportional to said control voltage through which energy from a source of energy energizes said coil thereby enabling said coil to generate a force generally proportional to the average current carried by said pulse width modulated output signal so as to control operation of said solenoid operated valve thereby controlling operation of said brake control apparatus; and (c) a means, disposed between said coil and said pulse generating means, for generating said feedback signal so as to enable said pulse generating means to adjust said pulse width modulated signal to compensate for variations in energy supplied by said source of energy.

17. The pulse width modulated drive circuit recited in claim 16 wherein said pulse generating means includes:

(a) an input control means for receiving said input voltage signal from said brake control apparatus and said feedback signal derived by said feedback generating means and for generating in response thereto said control voltage;

(b) a pwm generator for receiving said control voltage from said input control means and for generating in response thereto said pulse width modulated signal whose duty cycle depends thereon; and (c) a frequency control means for setting the frequency of the pulses carried by said pulse width modulated signal generated by said pwm generator.

18. The pulse width modulated drive circuit recited in claim 17 wherein said output means includes:

(a) a switching means for activation by said pulse width modulated signal received from said pwm generator; and (b) a coil driving means driven by said switching means; such that when said switching means is activated, said switching means drives said coil driving means so that said coil driving means generates said pulse width modulated output signal through which energy from said source of energy is delivered to said coil.

19. The pulse width modulated drive circuit recited in claim 18 further comprising a current limiting means connected between said coil driving means and said input control means for affecting said control voltage input to said pwm generator such that when said current supplied by said coil driver means to said coil exceeds a predetermined maximum value the duty cycle of said pulse width modulated signal reduces to a predetermined level thereby protecting said coil driving means from potentially damaging current.

20. The pulse width modulated drive circuit recited in claim 18 further comprising a duty cycle limit timing means connected between said coil and said input control means for affecting said control voltage input to said pwm generator such that when the duty cycle of said pulse width modulated output signal has exceeded a prespecified percentage for a preset period of time said duty cycle limit timing means deactivates said pulse generating means and thus said pwm drive circuit for a preselected period of time.

* * * * *